United States Patent [19]
Hornbeck

[11] Patent Number: 5,939,802
[45] Date of Patent: Aug. 17, 1999

[54] AUTOMATIC BUS TRANSFER DEVICE FOR SINGLE PHASE AND MULTIPHASE POWER SYSTEMS, PROVIDING INFINITE ISOLATION

[75] Inventor: Donald W. Hornbeck, Pelham, N.H.

[73] Assignee: Rantec Microwave & Electronic, Inc., Los Osos, Calif.

[21] Appl. No.: 08/996,212

[22] Filed: Dec. 22, 1997

[51] Int. Cl.$^6$ .................................................. H02J 1/00
[52] U.S. Cl. ................................ 307/87; 307/64; 307/80
[58] Field of Search ................................ 307/64, 65, 66, 307/80, 85, 86, 87

[56] References Cited

U.S. PATENT DOCUMENTS

| | | | |
|---|---|---|---|
| 5,519,261 | 5/1996 | Stewart | 307/87 |
| 5,621,254 | 4/1997 | Takeda et al. | 307/64 |
| 5,642,002 | 6/1997 | Mekanik et al. | 307/64 |
| 5,739,594 | 4/1998 | Sheppard et al. | 307/64 |

OTHER PUBLICATIONS

"Automatic Transfer Switch Systems", DynaGen Brochure, May 1996.
"Automatic Standby Transfer", Benjamin Electric Brochure (no date).
"940 Automatic Transfer Switch", ASCO Brochure (start date of web site Jun. 1997).
"ASCO Announces A Breakthrough In Automatic Transfer Switching Technology For Critical Power Applications", ASCO Brochure (start date of web site Jun. 1997).
"Power Quest Communications", ASCO Brochure (start date of web site Jun. 1997).
"Subcycle Automatic Transfer Switches", G&W Electric Company Brochure (no date).

*Primary Examiner*—Jeffrey Gaffin
*Assistant Examiner*—Jonathan S Kaplan
*Attorney, Agent, or Firm*—Pillsbury Madison & Sutro LLP

[57] ABSTRACT

An automatic bus transfer device is provided for single phase and multiphase power systems. The automatic bus transfer device provides infinite isolation and automatic switching from a primary power bus to a secondary power bus when the power (or voltage) being provided by the primary power bus falls below a predetermined level. The automatic bus transfer device includes a relay and a signal detector. The relay includes a master portion and a slave portion. The slave portion has a first input terminal, a second input terminal and an output terminal. The slave portion is switchable from a primary state to a secondary state and vice versa in a manner responsive to the master portion. The output terminal of the slave portion is electrically connected to a primary one of the input terminals when the slave portion is in the primary state and is electrically connected to a secondary one of the input terminals when the slave portion is in the secondary state. When the primary one of the input terminals carries a signal above a predetermined level, the master portion drives the slave portion into the primary state. Similarly, when the primary one of the input terminals of the relay carries a signal below the predetermined level, the slave portion is driven into the secondary state. A switching element is provided for selectively determining which of the input terminals of the relay constitutes the primary terminal.

88 Claims, 5 Drawing Sheets

AUTOMATIC BUS TRANSFER DEVICE FOR SINGLE PHASE AND MULTIPHASE POWER SYSTEMS, PROVIDING INFINITE ISOLATION

BACKGROUND OF THE INVENTION

The present invention relates to an automatic bus transfer device for single phase and multiphase power systems. The automatic bus transfer device provides infinite isolation and automatic switching from a primary power bus to a secondary power bus when the power (or voltage) being provided by the primary power bus falls below a predetermined level.

Both tactical and commercial power supply systems often require uninterrupted power at a desired voltage level or at desired voltage levels. This can be provided using an expensive uninterruptable power system (UPS). UPS arrangements, however, degrade system reliability because an additional single thread of power conditioning is required (e.g., an inverter operated by a battery which is floated on the input of the inverter). If the UPS fails, the entire system is rendered inoperative. An UPS also requires a substantial amount of energy and exhibits a burden relative to the overall operating efficiency of the power supply arrangement. In battery back-up UPS arrangements, the batteries add significant weight to the overall arrangement. A battery also has a limited lifetime and therefore eventually must be replaced.

There are several known techniques and devices for switching between a primary power source and secondary power source. Examples of such techniques and devices can be found aboard tactical platforms, such as between the starboard and port power supplies on military vessels and aircraft, as well as in commercial applications such as hospitals, financial institutions, broadcasting stations, and other facilities where the supply of power is critical.

The majority of critical power supplies use dual sources of power which are arranged so that when one source fails the alternate source is utilized by switching the power load to the alternate source.

A first such arrangement uses magnetic isolation between two sources of power. The requisite source isolation, however, is provided at the expense of considerable weight and volume, as well as structure-borne and airborne noise. Isolation magnetics operating at 1 kVA or more, for example, tend to create severe levels of structure-borne and airborne noise. To overcome the problem of noise, a significant amount of acoustic shielding is required. This, in turn, adds to the overall weight of the power supply system. In addition, the volume of the power supply system is increased by the line frequency isolation magnetics. Decoupling diodes are required at the output from each power factor correction circuit of the power supply system, along with a suitable failure monitoring arrangement. If a transient becomes coupled to either or both power supply buses, the magnetic isolators may become damaged, thereby permanently degrading performance of the power supply arrangement.

Figure 4:
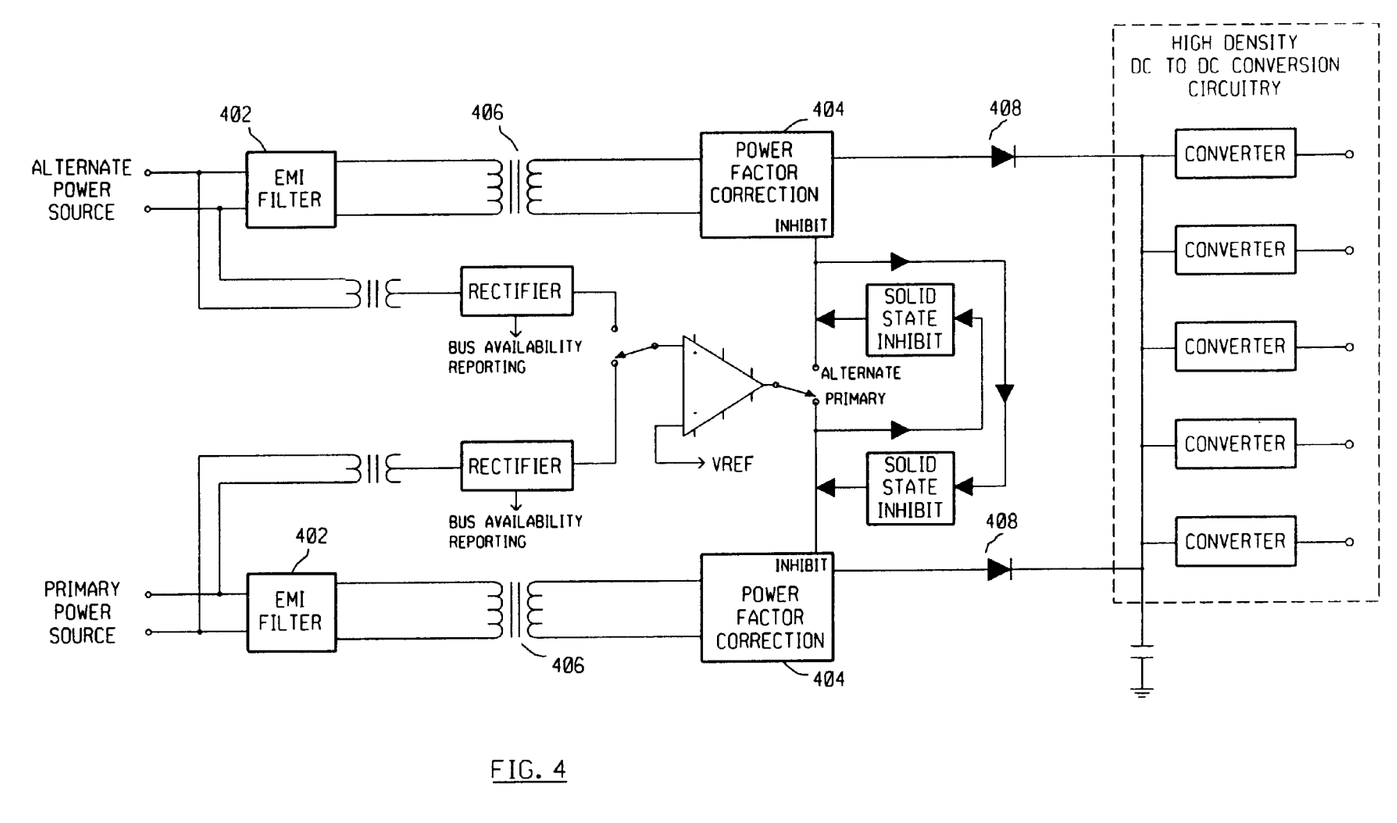
FIG. 4 schematically illustrates a first type of dual power supply which provides magnetic isolation between two sources of power.

FIG. 4 schematically illustrates an example of the first type of dual power supply. The illustrated dual power supply includes two separate EMI filters 402 and two separate power factor correction modules 404. Between each EMI filter 402 and the associated power factor correction module 404, there is an isolation transformer 406.

Each isolation transformer 406 operates at a power level of 130% of the user's required output power. The dual power supply, therefore, suffers from the problems described above. For example, a typical 1 Kw transformer 406 weighs approximately thirty one pounds. The transformers 406 alone therefore account for sixty two pounds in the total weight of a one kilowatt dual power supply.

The arrangement illustrated in FIG. 4 also requires decoupling diodes 408 and a fault reporting arrangement capable of indicating when the decoupling diodes 408 have failed.

Figure 5:
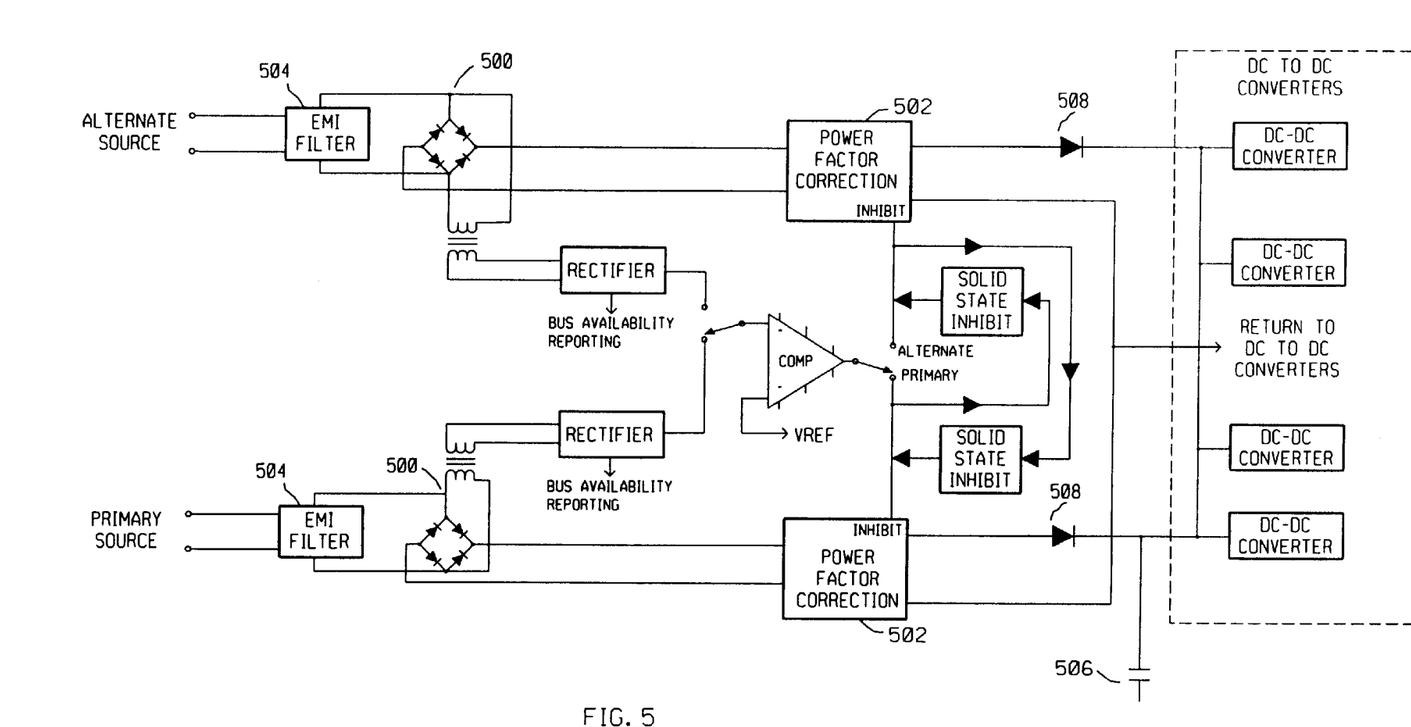
FIG. 5 schematically illustrates a second type of dual power supply which utilizes input diode bridge rectifiers to provide the requisite isolation between two power supply sources.

As illustrated in FIG. 5, a second type of dual power supply arrangement utilizes input diode bridge rectifiers 500 to provide the requisite isolation between two power supply sources. In particular, two power factor correction circuits 502 (PFC circuits) and two EMI (electromagnetic interference) filters 504 are included in the dual power supply arrangement. Each combination of a PFC circuit 502 and an EMI filter 504 is associated with its respective input diode bridge rectifier 500. The break-down voltage of each input diode bridge rectifier 500 is rated for the imposed hourly maximum test voltage to ensure safe operation (hi-pot peak) of, for example, 1039 volts. A voltage hold-up device 506 is located at the output from the PFC circuit to maintain a desired voltage level, even during transients up to 22 milliseconds in duration.

Typically, such diode bridge rectifier-based arrangements require output PFC decoupling diodes 508 and a fault reporting arrangement capable of indicating when the decoupling diodes have failed. The PFC BITE (power factor correction built-in test equipment) and availability of both buses are reported via a relay or optical isolator. Bus-to-output isolation is provided only by the output modules. Failure of a diode associated with the input diode bridge rectifier may create a safety hazard to personnel as the outputs from both power sources are then connected to one another as a result of this failure.

Further, since each power supply device requires its own EMI filter 504 and its own PFC circuit 502, an additional disadvantage of the input diode bridge rectifier-based arrangement is the need for twice the number of EMI filters and PFC circuits.

SUMMARY OF THE INVENTION

It is a primary object of the present invention to provide an automatic bus transfer device for single phase and multiphase power systems which overcomes the disadvantages and shortcomings of the aforementioned arrangements.

Another object of the present invention is to provide an automatic bus transfer device which provides infinite isolation between a primary power supply bus and a secondary power supply bus.

To achieve these and other objects, the present invention provides an automatic bus transfer device which includes a relay and a signal detector. The relay has a master portion and a slave portion. The slave portion includes a first input terminal, a second input terminal and an output terminal. The slave portion is switchable from a primary state to a secondary state and from the secondary state to the primary state in a manner responsive to the master portion. The output terminal of the relay is electrically connected to a primary one of the first and second input terminals when the slave portion is in the primary state and is electrically connected to a secondary one of the first and second input terminals when the slave portion is in the secondary state.

The signal detector has an output connected to the master portion and an input connectable, at least indirectly, to the primary one of the first and second input terminals of the relay so that: 1) when the primary one of the first and second input terminals carries a signal above a predetermined level, the slave portion is driven by the master portion into the primary state, and 2) when the primary one of the first and second input terminals of the relay carries a signal below the predetermined level, the slave portion is driven by the master portion into the secondary state.

Preferably, a switching element is provided for selectively determining which of the first and second input terminals of the relay constitutes the primary one of the first and second input terminals.

The signal detector preferably includes a comparator. The comparator includes a first input terminal, a second input terminal and an output terminal. The first input terminal of the comparator is connected by the switching element, at least indirectly, to the first input terminal of the relay when the first input terminal of the relay constitutes the primary one of the first and second input terminals. However, when the first input terminal of the relay constitutes the secondary one of the first and second input terminals, the first input terminal of the comparator is electrically connected by the switching element to a reference signal.

When the second input terminal of the relay constitutes the primary one of the first and second input terminals, the second input terminal of the comparator is connected by the switching element, at least indirectly, to the second input terminal of the relay. By contrast, when the second input terminal of the relay constitutes the secondary one of the first and second input terminals, the second input terminal of the comparator is electrically connected by the switching element to the reference signal. The output terminal of the comparator is electrically connected to the master portion of the relay.

The switching element preferably is electrically connected to the input of the signal detector, and is switchable from a first configuration to a second configuration and from the second configuration to the first configuration.

In the first configuration, the input of the signal detector is electrically connected, at least indirectly, to the first input terminal of the relay. In the second configuration, by contrast, the input of the signal detector is electrically connected, at least indirectly, to the second input terminal of the relay.

Preferably, the relay is arranged so as to provide substantially complete isolation (preferably complete isolation) between the first and second input terminals.

The relay may be a magnetically actuated relay, wherein the master portion includes a magnetic winding and the slave portion includes electrical contacts. The electrical contacts selectively electrically connect the output terminal of the relay to one of the first and second input terminals in a manner dependent upon whether a magnetic field is generated by the magnetic winding.

If there is no desire or need to selectively determine which of two sources constitutes the primary source of power, the comparator of the signal detector can be arranged so that the first input terminal is electrically connected to the primary one of the first and second input terminals of the relay (to which the primary source of power is connected), the second input terminal is electrically connected to the reference voltage, and the output terminal is electrically connected to the master portion of the relay.

A first rectifier may be electrically connected between the input of the signal detector and the first input terminal of the relay. Likewise, a second rectifier may be electrically connected between the input of the signal detector and the second input terminal of the relay.

Preferably, a first transformer is electrically connected between the first rectifier and the first input terminal of the relay. A second transformer preferably is electrically connected between the second rectifier and the second input terminal of the relay.

The present invention also may include signal conditioning circuitry connected to the output terminal of the relay. The signal conditioning circuitry preferably includes an electromagnetic interference filter and a power factor correction module. The signal conditioning circuitry preferably is adapted to convert an AC signal at the output terminal of the relay into a DC signal having a voltage level of at least 220 volts.

A voltage holding element may be connected to an output from the signal conditioning circuitry. In particular, the voltage holding element is adapted to maintain, during drops in voltage at the output terminal of the relay, a desired minimum voltage at the output from the signal conditioning circuitry for a predetermined minimum period of time. The voltage holding element preferably includes at least one capacitor for temporarily storing energy which is used to provide the desired minimum amount of voltage.

The automatic bus transfer device further may include at least one DC-to-DC converter connected to the output from the power factor correction module.

The automatic bus transfer device preferably provides switching between two AC voltage sources (or two DC voltage sources), and the signal detector preferably constitutes a voltage level detector. When the primary one of the first and second input terminals carries an AC voltage having a peak value greater than a predetermined level, the slave portion is driven by the master portion into the aforementioned primary state. However, when the primary one of the first and second input terminals of the relay carries an AC voltage having a peak value less than the predetermined level, the slave portion is driven by the master portion into the aforementioned secondary state.

The present invention also provides a dual-source power supply bus capable of automatically switching between two AC voltage sources. The dual-source power supply bus includes a first AC voltage source, a second AC voltage source, and an automatic bus transfer device as described above.

The above and other objects and advantages will become more readily apparent when reference is made to the following description taken in conjunction with the accompanying drawings.

DESCRIPTION OF A PREFERRED EMBODIMENT

A preferred embodiment of the present invention will now be described with reference to the accompanying drawings.

Figure 1:
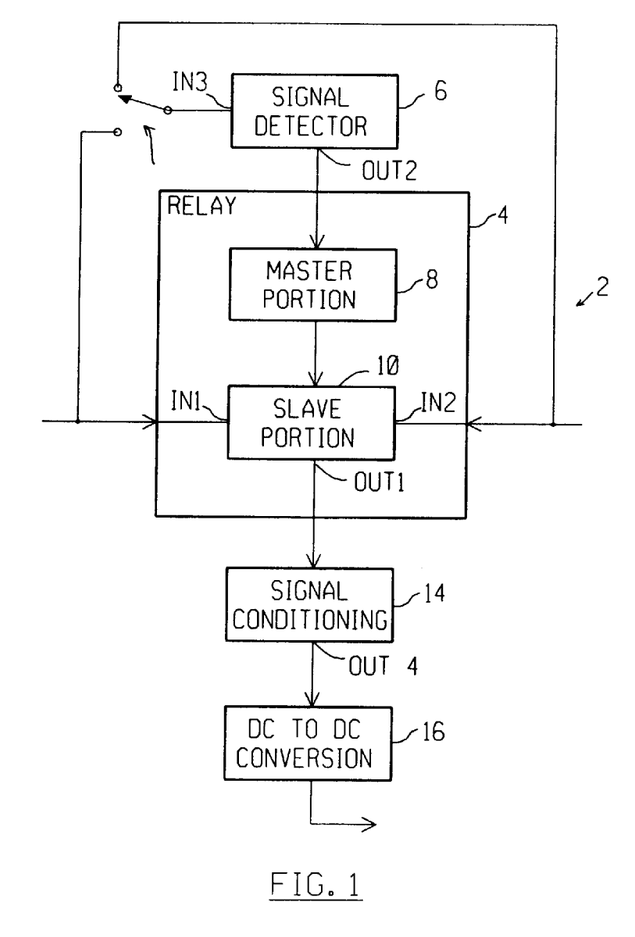
FIG. 1 is a block diagram of an automatic bus transfer device according to a preferred embodiment of the present invention.

As illustrated in FIG. 1, the present invention provides an automatic bus transfer device 2 including a relay 4 and a signal detector 6.

The relay 4 includes a master portion 8 and a slave portion 10. The slave portion 10 has a first input terminal IN1, a second input terminal IN2 and an output terminal OUT1. The slave portion 10 is switchable from a primary state to a secondary state and from the secondary state to the primary state in a manner responsive to the master portion 8. The output terminal OUT1 of the slave portion 10 is electrically connected to a primary one of the first and second input terminals IN1,IN2 when the slave portion 10 is in the primary state and is electrically connected to a secondary one of the first and second input terminals IN1,IN2 when the slave portion 10 is in the secondary state.

Preferably, the relay 4 is arranged so that it is impossible for both of the first and second input terminals IN1,IN2 to be simultaneously connected to the output terminal OUT1 of the relay 4, or to one another. The relay 4 therefore is arranged so as to provide substantially complete isolation (preferably complete isolation) between the first and second input terminals IN1,IN2.

The signal detector 6 includes an output OUT2 connected to the master portion 8 and an input IN3 connectable, at least indirectly, to the primary one of the first and second input terminals IN1,IN2 of the relay 4. When the primary one of the first and second input terminals IN1,IN2 carries a signal above a predetermined level, the master portion 8 (based on the output OUT2) drives the slave portion 10 into the primary state. The primary one of the input terminals IN1,IN2 thereby is connected to the output terminal OUT1 of the relay 4.

Similarly, when the primary one of the first and second input terminals IN1,IN2 of the relay 4 carries a signal below the predetermined level, the slave portion 10 is driven by the master portion 8 into the secondary state. The secondary one of the input terminals IN1,IN2 thereby is connected to the output terminal OUT1 of the relay 4.

Preferably, a switching element 12 is provided for selectively determining which of the first and second input terminals IN1,IN2 of the relay 4 constitutes the primary one of the first and second input terminals IN1,IN2. The switching element is electrically connected to the input IN3 of the signal detector 6 and is switchable from a first configuration to a second configuration, as well as being switchable from the second configuration to the first configuration.

In the first configuration, the input IN3 of the signal detector 6 is electrically connected, at least indirectly, to the first input terminal IN1 of the relay 4. In the second configuration, by contrast, the second input terminal IN2 of the relay 4 is electrically connected, at least indirectly, to the input IN3 of the signal detector 6.

The illustrated automatic bus transfer device 2 preferably is provided as part of a dual-source power supply bus and is arranged so as to automatically switch between the two sources of power in the bus. The sources of power may be DC voltage sources or AC voltage sources. An exemplary arrangement using AC voltages will now be described.

The AC voltage sources are connected respectively to the first and second input terminals IN1,IN2 of the relay 4. The signal detector 6 therefore detects the voltage level (e.g., the peak voltage in an AC voltage arrangement) of the primary source and determines whether the detected level is below a predetermined value. If the voltage level is below the predetermined value, the signal detector 6 causes the relay 4 to switch away from the primary source and to the secondary AC voltage source.

Preferably, signal conditioning circuitry 14 is connected to the output terminal OUT1 of the relay 4. In addition, DC-to-DC conversion circuitry 16 may be connected to an output OUT4 from the signal conditioning circuitry 14. The DC-to-DC conversion circuitry 16 preferably includes several DC output taps 17 (illustrated in FIGS. 2 and 3), each of which provides a different voltage level. The different voltage levels can be used to power different devices having different power requirements.

Figure 2:
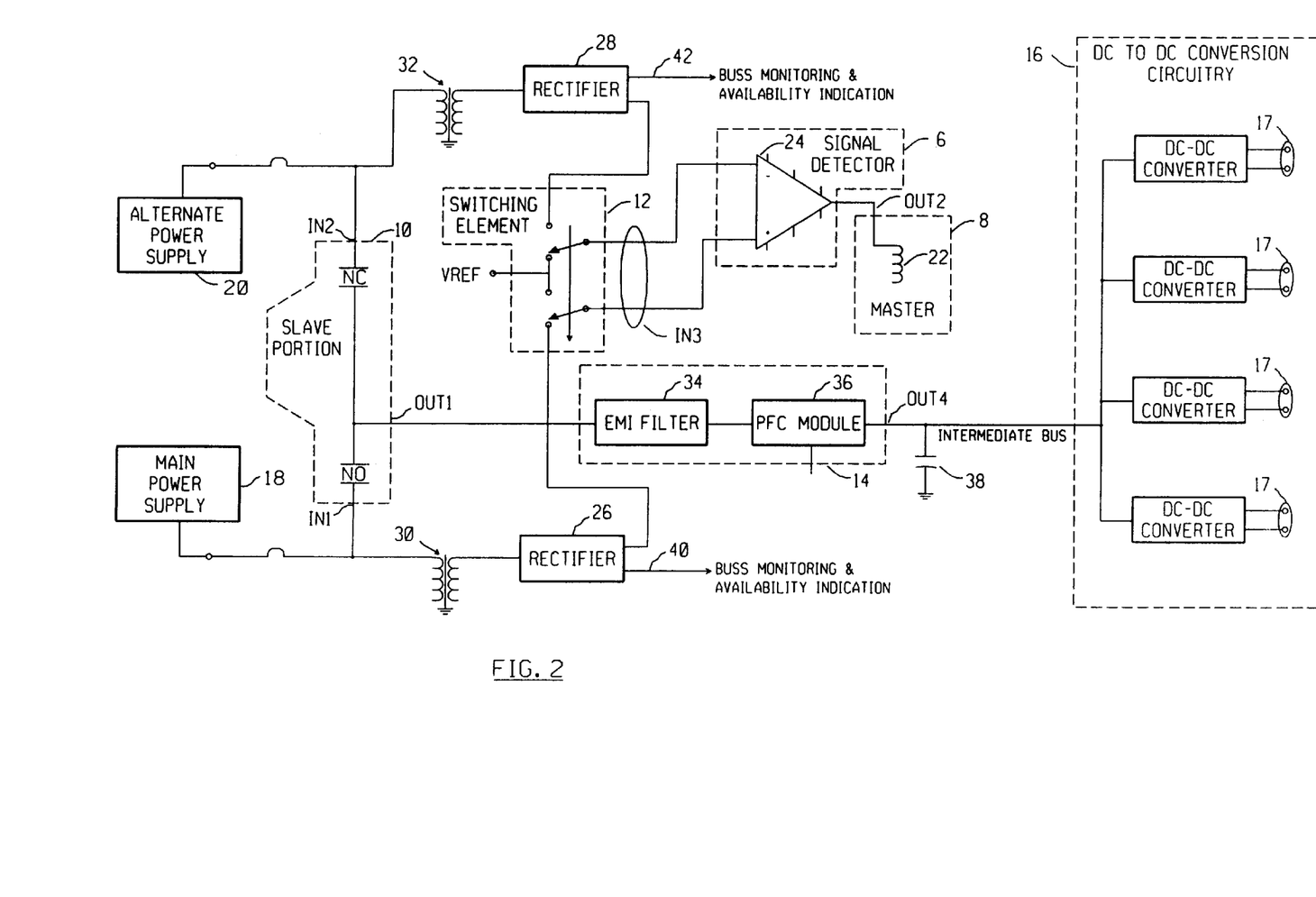
FIG. 2 schematically illustrates a preferred implementation of the preferred embodiment illustrated in FIG. 1, which is configured so that a main power supply serves as the primary source of power, while the alternate power supply is used as a back-up source of power.
Figure 3:
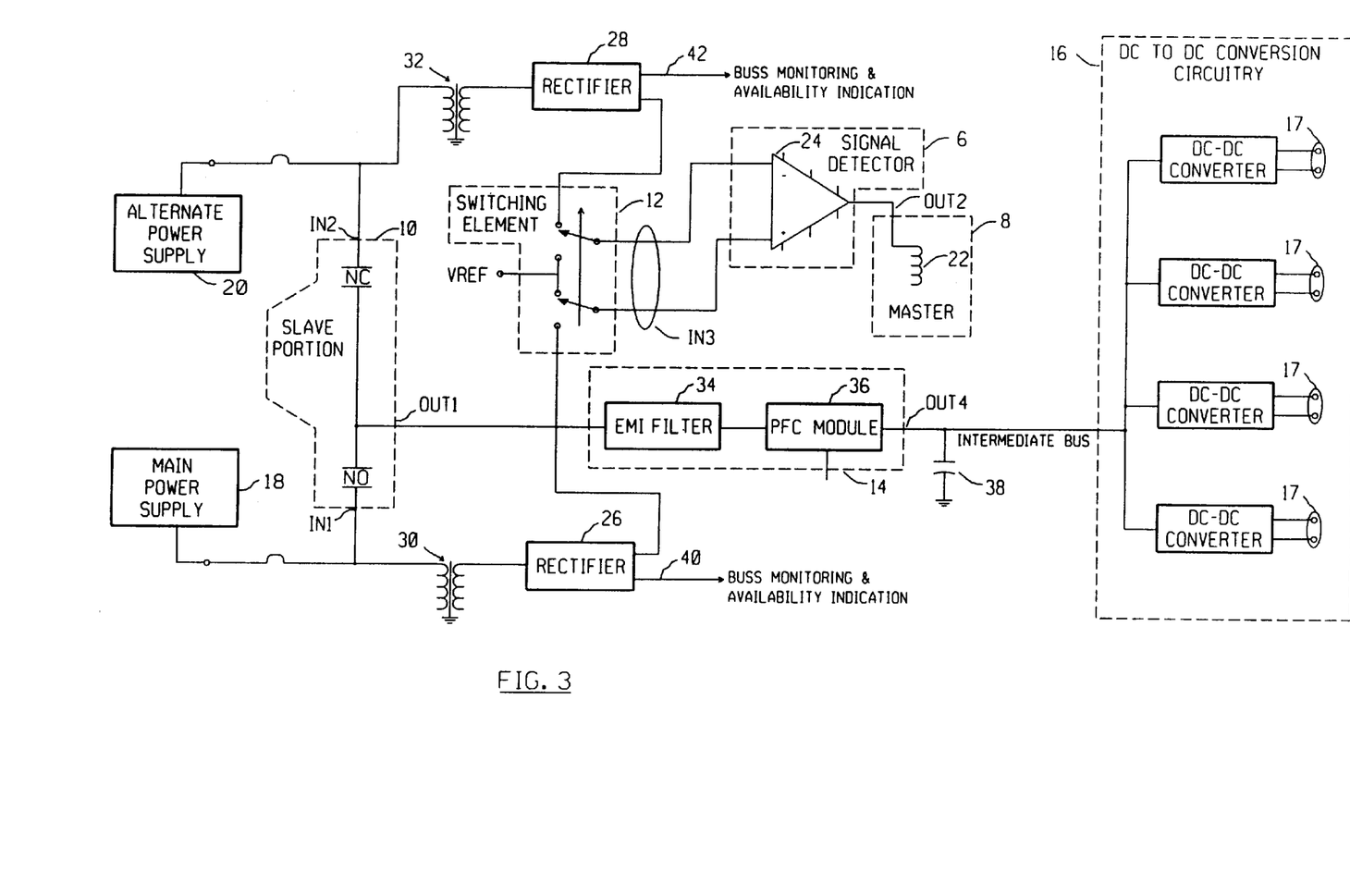
FIG. 3 schematically illustrates the implementation of FIG. 2, but configured so that the alternate power supply serves as the primary source of power, while the main power supply is used as a back-up source of power.

A preferred implementation of the embodiment illustrated in FIG. 1 is shown in FIGS. 2 and 3. In FIG. 2, the automatic bus transfer device 2 is configured so that the main power supply 18 serves as the primary source of power, while the alternate power supply 20 is used as a back-up source of power. As described hereinafter, the back-up source is utilized automatically whenever the primary source becomes inoperative.

FIG. 3 shows an arrangement wherein the main power supply 18 constitutes the back-up source of power, while the alternate power supply 20 serves as the primary source of power. The difference between FIGS. 2 and 3 is the position of the switching element 12. The switching element 12 therefore allows a user of the automatic bus transfer device 2 to designate which of the two power supplies 18,20 will constitute the primary source of power and which will constitute the secondary source of power.

Although the switching element 12 in this embodiment constitutes a double-pole, double-throw switch, it is understood that other arrangements can be used to achieve the function of the switching element 12.

Preferably, as illustrated in FIGS. 2 and 3, the relay 4 is a magnetically actuated relay. The master portion 8 of the relay 4 therefore includes a magnetic winding 22, and the slave portion 10 of the relay 4 includes electrical contacts NC and NO. The electrical contacts NC and NO selectively electrically connect the output terminal OUT1 of the relay 4 to one of the first and second input terminals IN1,IN2 in a manner dependent upon whether a magnetic field is being generated by the magnetic winding 22. The contact NC is normally closed and the contact NO is normally open. Thus, when no current flows through the magnetic winding 22, the contact NC remains closed while the contact NO remains open. This reverses, however, when current flows through the magnetic winding 22 to generate a magnetic field. Upon generation of a suitable magnetic field, the normally closed contact NC opens and the normally open contact NO closes.

The signal detector 6 preferably includes a comparator 24. The comparator 24 has a non-inverting input terminal (+), an inverting input terminal (−), and an output terminal which is connected to the magnetic winding 22.

The non-inverting input terminal (+) and the inverting input terminal (−) are connected to the switching element 12. When the first input terminal IN1 of the relay 4 constitutes the primary terminal and the second input terminal IN2 constitutes the secondary terminal, the switching element 12 is switched to the position shown in FIG. 2. As a result, the non-inverting input terminal (+) of the comparator 24 is connected by the switching element 12, at least indirectly, to the first input terminal IN1 of the relay 4, while the inverting input terminal (−) of the comparator 24 is electrically connected to a reference signal (preferably a reference voltage $V_{ref}$). The comparator 24, therefore, compares a signal derived from the first input terminal IN1 to the reference signal, and provides an output current through the magnetic winding 22 when the signal derived from the first input terminal IN1 exceeds the reference signal.

By contrast, when the first input terminal IN1 of the relay 4 constitutes the secondary terminal and the second input terminal IN2 constitutes the primary terminal, the non-inverting input terminal (+) of the comparator 24 is electrically connected by the switching element 12 to the reference signal (or reference voltage $V_{ref}$), while the non-inverting input terminal (+) of the comparator 24 is connected, at least indirectly, to the second input terminal IN2 of the relay. The comparator 24, therefore, compares a signal derived from the input terminal IN2 to the reference signal and provides an output current through the magnetic winding 22 when the reference signal exceeds the signal derived from the input terminal IN2.

Although the preferred embodiment includes the switching element 12, it is understood that the switching element 12 can be eliminated if, for example, it is desirable to always designate a particular one of the sources as the primary source of power. In such an arrangement, the non-inverting input terminal (+) of the comparator 24 is electrically connected, at least indirectly, to the primary one of the first and second input terminals IN1,IN2 of the relay 4; the inverting input terminal (−) is electrically connected to the reference voltage; and the output terminal would remain electrically connected to the master portion 8 of the relay 4. This arrangement can be visualized by making the switch connections illustrated in one of FIGS. 2 and 3 into permanent conductive connections.

As illustrated in FIGS. 2 and 3, the automatic bus transfer device 2 preferably includes first and second rectifiers 26,28. The first rectifier 26 is electrically connected between the input IN3 of the signal detector 6 and the first input terminal IN1 of the relay 4. The second rectifier 28 is electrically connected between the input IN3 of the signal detector 6 and the second input terminal IN2 of the relay 4.

In addition, the automatic bus transfer device 2 preferably further includes a first transformer 30 and a second transformer 32. The first transformer 30 is electrically connected between the first rectifier 26 and the first input terminal IN1 of the relay 4. The second transformer 32 is electrically connected between the second rectifier 28 and the second input terminal IN2 of the relay 4. The transformers 30,32 advantageously can be provided using very small, low power transformers (e.g., 5.0 VA). This represents a significant improvement over other arrangements which require prohibitively heavy and bulky transformers or isolation magnetics.

The transformers 30,32 are rated at approximately 5.0 VA, and provide isolation for purposes of amplitude detection relative to the two input power buses. The rectified output voltage of each transformer is normally 12 volts DC so as to operate and interface the comparator 4 directly.

If the voltage sources are DC instead of AC, the transformers 30,32 and rectifiers 26,28 can be eliminated from the circuitry illustrated in FIGS. 2 and 3, the transformers 30,32 being replaced with isolated DC-to-DC converters. Alternatively, only one set can be eliminated to accommodate a combination of an AC voltage source and a DC voltage source.

As illustrated in FIGS. 2 and 3, the signal conditioning circuitry 14 may include an electromagnetic interference (EMI) filter 34 and a power factor correction (PFC) module 36. Advantageously, the illustrated implementation of the preferred embodiment can be achieved using one EMI filter 34 and one power factor correction module 36. This represents a significant advantage over arrangements, such as those illustrated in FIGS. 4 and 5, which require at least two EMI filters and at least two PFC modules. The parts count reliability prediction of the embodiment illustrated in FIGS. 2 and 3, for example, is significantly enhanced by the reduction in the number of EMI filters and PFC modules.

For a preferred application of the present invention, the signal conditioning circuitry 14 is adapted to convert an AC signal (e.g., 85–270 volts rms AC (VAC) at 47–440 Hz (single or multiphase)) at the output terminal OUT1 of the relay 4 into a DC signal having a voltage level of at least 220 volts (and preferably 360 volts DC).

A voltage holding element 38 may be connected to the output OUT4 from the signal conditioning circuitry 14. The voltage holding element 38 is adapted to maintain, during drops in voltage at the output terminal OUT1 of the relay, a desired minimum voltage at the output OUT4 from the signal conditioning circuitry 14 for a predetermined minimum period of time.

Preferably, the voltage holding element 38 includes at least one capacitor for temporarily storing energy which is used to provide the desired minimum amount of voltage at the output OUT4 during voltage drops at the output OUT1 The capacitance of the voltage holding element 38 preferably is selected so that, if the primary source becomes disabled, the voltage at the output OUT4 remains above 220 volts for at least twice the period of time necessary for the relay 4 to be switched from the primary state to the secondary state. The voltage at the output OUT4 therefore is certain to remain above 220 volts when the power source is switched from the primary source to the secondary source.

The 220 volt minimum is selected because that is the minimum voltage required by known DC-to-DC conversion circuitry 16 to avoid output degradation. Of course, the present invention is not limited to such DC-to-DC conversion circuitry 16 and therefore the actual minimum voltage will depend on the particular application of the present invention.

Since it may take as little as 10 milliseconds to effect switching from one power source to another, the capacitance of the voltage holding element 38 preferably is selected so as to maintain at least 220 volts (or any other minimum value) for about 22 milliseconds or more after the primary source stops providing sufficient voltage. This provides a conservative margin of additional power which, in turn, enhances reliability of the dual-source power bus.

Preferably, each rectifier 26,28 provides an additional output signal indicative of whether its respective power source 18,20 is providing a predetermined minimum voltage. This additional output signal can be connected to bus monitoring and availability indicators or recorders (not shown).

An exemplary operation of the circuitry illustrated in FIGS. 2 and 3 will now be described. Initially, the two sources of AC power 18,20 are connected to the input terminals IN1,IN2. For purposes of this example, it will be assumed that the user wishes to have the main power supply 18 constitute the primary one of the power sources. Accordingly, the switching element 12 is placed in the configuration illustrated in FIG. 2.

The comparator 24 therefore compares the rectified voltage from the rectifier 26 (which is indicative of the peak voltage of the main power supply 18) to the reference voltage $V_{ref}$. The reference voltage $V_{ref}$ preferably is set so as to equal the rectified voltage when the primary source of power produces only 85 VAC. The comparator 24 therefore turns off current to the magnetic winding 22 when the output voltage from the main power supply 18 drops below 85 VAC. The choice of 85 VAC is made because, at that voltage, the signal conditioning circuitry 14 is no longer capable of providing a desired minimum voltage (e.g., between 220 volts DC and 360 volts DC). The actual choice of reference voltage $V_{ref}$ will vary depending on the particular output requirements of the dual-source bus.

When the main power supply 18 (which normally provides 85–270 VAC) provides 85 VAC or more, the comparator 24 keeps current flowing through the magnetic winding 22. The normally open contact NO, therefore, remains closed and the normally closed contact NC remains open. The DC-to-DC conversion circuitry 16 therefore continues to receive 220–360 volts DC (actually 360 volts when the main power supply 18 provides more than 90 VAC) from the signal conditioning circuitry 14, and the signal conditioning circuitry 14, in turn, is powered by the 85–270 VAC from the main power supply 18. The DC-to-DC conversion circuitry therefore is powered by the main power supply 18.

If, however, the voltage supplied by the main power supply 18 drops below 85 VAC, the comparator 24 determines that the reference voltage $V_{ref}$ is higher than the rectified voltage from the rectifier 26. The comparator 24 therefore terminates the flow of current through the magnetic winding 22. As a result, the normally open contact NO returns to the open state, and the normally closed contact NC returns to the closed state. The alternate power supply 20 thereby is electrically connected to the output terminal OUT1 of the relay 4, and the signal conditioning circuitry 14 receives power from the alternate power supply 20.

During the period of time between the drop in voltage of the main power supply 18 below 85 VAC and the electrical connection of the alternative power supply 20 to the signal conditioning circuitry 14, the voltage holding element 38 keeps the voltage at the output OUT4 of the signal conditioning circuitry 14 at or above the desired minimum of 220 volts. The DC-to-DC conversion circuitry 16 therefore receives sufficient voltage to remain adequately powered.

The arrangement illustrated in FIG. 2 thus provides automatic switching from a primary power supply to a secondary power supply without interrupting operation of the dual-source bus.

In addition, it may be necessary or desirable to occasionally operate the alternate power supply as the primary source and to operate the main power supply as the secondary source. The switching element 12, therefore, may be actuated to achieve the configuration illustrated in FIG. 3.

In FIG. 3, the alternate power supply 20 has been designated to be the primary source of power, while the main power supply 18 operates as the secondary source.

The comparator 24 therefore compares the rectified voltage from the rectifier 28 (which is indicative of the peak voltage of the alternate power supply 20) to the reference voltage $V_{ref}$. As indicated above, the reference voltage $V_{ref}$ preferably is set so as to equal the rectified voltage when the primary source of power produces only 85 VAC. The comparator 24 therefore turns on current to the magnetic winding 22 when the output voltage from the alternate power supply 20 drops below 85 VAC.

When the alternate power supply 20 (which normally provides 85–270 VAC) provides 85 VAC or more, the comparator 24 provides no current through the magnetic winding 22. The normally open contact NO, therefore, remains open and the normally closed contact NC remains closed. The DC-to-DC conversion circuitry 16 therefore continues to receive 220–360 volts DC (normally 360 volts) from the signal conditioning circuitry 14, and the signal conditioning circuitry 14, in turn, is powered by the 85–270 VAC from the alternate power supply 20. The DC-to-DC conversion circuitry therefore is powered by the alternate power supply 20.

If, however, the voltage supplied by the alternate power supply 20 drops below 85 VAC, the comparator 24 determines that the reference voltage $V_{ref}$ is higher than the rectified voltage from the rectifier 28. The comparator 24 therefore applies current to the magnetic winding 22. As a result, the normally open contact NO closes and the normally closed contact NC opens. The main power supply 18 thereby is electrically connected to the output terminal OUT1 of the relay 4, and the signal conditioning circuitry 14 receives power from the main power supply 18.

During the period of time between the drop in voltage of the alternate power supply 20 below 85 VAC and the electrical connection of the main power supply 18 to the signal conditioning circuitry 14, the voltage holding element 38 keeps the voltage at the output OUT4 of the signal conditioning circuitry 14 at or above the desired minimum voltage. The DC-to-DC conversion circuitry 16 therefore receives sufficient voltage to remain adequately powered.

Thus, regardless of the position of the switching element 12, the arrangement illustrated in FIGS. 2 and 3 provides automatic switching from a primary source of power to a secondary source of power without interrupting operation of the dual-source bus.

As illustrated in FIGS. 2 and 3, the PFC module 36 also may include an Input Line/PFC Fail Signal indicative of whether the PFC module 36 has failed or is operative.

Absolute isolation may be provided by the present invention between the primary source and the secondary source. Preferably, all feeds and the return are isolated and switched. In multiphase arrangements, the relay preferably includes a number of contacts sufficient to switch all of the phases simultaneously.

High-potting between the dual sources at an amplitude of several thousand volts also can be tolerated by the arrangement illustrated in FIGS. 2 and 3.

Advantageously, the illustrated implementation of the preferred embodiment can be achieved using one EMI filter and one power factor correction module. As indicated above, this represents a significant advantage over arrangements, such as those illustrated in FIGS. 4 and 5, which require at least two EMI filters and at least two PFC modules. The parts count reliability prediction of the embodiment illustrated in FIGS. 2 and 3, for example, is significantly enhanced by the reduction in the number of EMI filters and PFC modules.

The low power level of the magnetics in the present invention advantageously avoids the problem of excessive structure-borne noise. Magnetics at such low power levels have qualified for deployment aboard surface and subsurface platforms without producing the excessive levels of structure-borne noise which are exhibited by high power (e.g., greater than 600 VA) line frequency magnetics of alternative arrangements.

The arrangement illustrated in FIGS. 2 and 3 is particularly well-suited for use as an NSSN turbine controller low voltage power supply, as well as the NSSN weapons handling and weapons launch systems' low voltage power supply. For the turbine controller application, the DC output taps 17 preferably provide respective voltages of 5 volts DC; 12 volts DC; −12 volts DC; and 28 volts DC.

As a further advantage of the present invention, there is no need to employ decoupling diodes at the outputs from two different PFC modules. The present invention therefore eliminates the danger associated with failure of such diodes and also eliminates the need to monitor the diodes' conditions.

Although the present invention has been described with reference to preferred embodiments and applications, it is understood that the invention is not limited to these embodiments and application. To the contrary, the invention is limited only by the full scope of the appended claims.

I claim:

1. An automatic bus transfer device comprising:
   a relay having a master portion and a slave portion, said slave portion having a first input terminal, a second input terminal and an output terminal, said slave portion being switchable from a primary state to a secondary state and from said secondary state to said primary state, said output terminal being electrically connected to a primary one of said first and second input terminals when said slave portion is in said primary state and being electrically connected to a secondary one of said first and second input terminals when said slave portion is in said secondary state; and
   a signal detector having an output connected to said master portion and an input connectable, indirectly, to said primary one of the first and second input terminals of the relay so that:
      when said primary one of the first and second input terminals carries a signal above a predetermined level, said slave portion is driven by said master portion into said primary state, and
      when said primary one of the first and second input terminals of the relay carries a signal below said predetermined level, said slave portion is driven by said master portion into said secondary state.

2. The automatic bus transfer device of claim 1, further comprising a switching element for selectively determining which of said first and second input terminals of the relay constitutes said primary one of the first and second input terminals.

3. The automatic bus transfer device of claim 2, wherein said signal detector includes a comparator, said comparator having:
   a first input terminal connected by said switching element, directly or indirectly, to said first input terminal of the relay when said first input terminal of the relay constitutes said primary one of the first and second input terminals, said first input terminal of the comparator being electrically connected by said switching element to a reference signal when said first input terminal of the relay constitutes said secondary one of the first and second input terminals;
   a second input terminal connected by said switching element, directly or indirectly, to said second input terminal of the relay when said second input terminal of the relay constitutes said primary one of the first and second input terminals, said second input terminal of the comparator being electrically connected by said switching element to said reference signal when said second input terminal of the relay constitutes said secondary one of the first and second input terminals; and
   an output terminal electrically connected to said master portion of the relay.

4. The automatic bus transfer device of claim 2, wherein said switching element is electrically connected to said input of the signal detector, said switching element being switchable from a first configuration to a second configuration and from said second configuration to said first configuration, and wherein:
   in said first configuration, said input of the signal detector is electrically connected, directly or indirectly, to said first input terminal of the relay, and
   in said second configuration, said input of the signal detector is electrically connected, directly or indirectly, to said second input terminal of the relay.

5. The automatic bus transfer device of claim 4, wherein said signal detector includes a comparator, said comparator having:
   a first input terminal connected by said switching element, directly or indirectly, to said first input terminal of the relay when said switching element is in said first configuration, said first input terminal of the comparator being electrically connected by said switching element to a reference signal when said switching element is in said second configuration;
   a second input terminal connected by said switching element, directly indirectly, to said second input terminal of the relay when said switching element is in said second configuration, said second input terminal of the comparator being electrically connected by said switching element to said reference signal when said switching element is in said first configuration; and
   an output terminal electrically connected to said master portion of the relay.

6. The automatic bus transfer device of claim 1, further comprising a switching element electrically connected to said input of the signal detector, said switching element being switchable from a first configuration to a second configuration and from said second configuration to said first configuration, and wherein:
   in said first configuration, said input of the signal detector is electrically connected, directly or indirectly, to said first input terminal of the relay, and
   in said second configuration, said input of the signal detector is electrically connected, directly or indirectly, to said second input terminal of the relay.

7. The automatic bus transfer device of claim 1, further comprising switching means for selectively determining which of said first and second input terminals of the relay constitutes said primary one of the first and second input terminals.

8. The automatic bus transfer device of claim 1, wherein said relay is arranged so as to provide substantially complete isolation between said first and second input terminals.

9. The automatic bus transfer device of claim 1, wherein:
   said relay is a magnetically actuated relay;
   said master portion includes a magnetic winding; and
   said slave portion includes electrical contacts which selectively electrically connect said output terminal of the relay to one of said first and second input terminals in a manner dependent upon whether a magnetic field is generated by said magnetic winding.

10. The automatic bus transfer device of claim 1, wherein said signal detector includes a comparator, said comparator having:
   a first input terminal electrically connected to said primary one of said first and second input terminals of the relay;

a second input terminal electrically connected to a reference voltage; and an output terminal electrically connected to said master portion of the relay.

11. The automatic bus transfer device of claim 1, further comprising:

a first rectifier electrically connected between said input of the signal detector and said first input terminal of the relay; and a second rectifier electrically connected between said input of the signal detector and said second input terminal of the relay.

12. The automatic bus transfer device of claim 11, further comprising:

a first transformer electrically connected between said first rectifier and said first input terminal of the relay; and a second transformer electrically connected between said second rectifier and said second input terminal of the relay.

13. The automatic bus transfer device of claim 1, further comprising signal conditioning circuitry connected to the output terminal of the relay.

14. The automatic bus transfer device of claim 13, wherein said signal conditioning circuitry includes an electromagnetic interference filter and a power factor correction module.

15. The automatic bus transfer device of claim 14, wherein said signal conditioning circuitry is adapted to convert an AC signal at said output terminal of the relay into a DC signal having a voltage level of at least 220 volts.

16. The automatic bus transfer device of claim 15, further comprising a voltage holding element connected to an output from said signal conditioning circuitry, said voltage holding element being adapted to maintain, during drops in voltage at said output terminal of the relay, a desired minimum voltage at said output from the signal conditioning circuitry for a predetermined minimum period of time.

17. The automatic bus transfer device of claim 16, wherein said voltage holding element includes at least one capacitor for temporarily storing energy which is used to provide said desired minimum amount of voltage during said drops in voltage at the output terminal of the relay.

18. The automatic bus transfer device of claim 14, further comprising at least one DC-to-DC converter connected to an output from said power factor correction module.

19. An automatic bus transfer device for automatically switching between two AC voltage sources, said automatic bus transfer device comprising:

a relay having a master portion and a slave portion, said slave portion having a first input terminal connected to a first of said two AC voltage sources, a second input terminal connected to a second of said AC voltage sources, and an output terminal, said slave portion being switchable from a primary state to a secondary state and from said secondary state to said primary state, said output terminal being electrically connected to a primary one of said first and second input terminals when said slave portion is in said primary state and being electrically connected to a secondary one of said first and second input terminals when said slave portion is in said secondary state; and a voltage level detector having an output connected to said master portion and an input connectable, directly or indirectly, to said primary one of the first and second input terminals of the relay so that:

when said primary one of the first and second input terminals carries an AC voltage having a peak value greater than a predetermined level, said slave portion is driven by said master portion into said primary state, and when said primary one of the first and second input terminals of the relay carries an AC voltage having a peak value less than said predetermined level, said slave portion is driven by said master portion into said secondary state.

20. The automatic bus transfer device of claim 19, further comprising a switching element for selectively determining which of said first and second input terminals of the relay constitutes said primary one of the first and second input terminals.

21. The automatic bus transfer device of claim 20, wherein said signal detector includes a comparator, said comparator having:

a first input terminal connected by said switching element, indirectly, to said first input terminal of the relay when said first input terminal of the relay constitutes said primary one of the first and second input terminals, said first input terminal of the comparator being electrically connected by said switching element to a reference voltage when said first input terminal of the relay constitutes said secondary one of the first and second input terminals;

a second input terminal connected by said switching element, indirectly, to said second input terminal of the relay when said second input terminal of the relay constitutes said primary one of the first and second input terminals, said second input terminal of the comparator being electrically connected by said switching element to said reference voltage when said second input terminal of the relay constitutes said secondary one of the first and second input terminals; and an output terminal electrically connected to said master portion of the relay.

22. The automatic bus transfer device of claim 20, wherein said switching element is electrically connected to said input of the voltage level detector, said switching element being switchable from a first configuration to a second configuration and from said second configuration to said first configuration, and wherein:

in said first configuration, said input of the voltage level detector is electrically connected, directly or indirectly, to said first input terminal of the relay, and in said second configuration, said input of the voltage level detector is electrically connected, directly or indirectly, to said second input terminal of the relay.

23. The automatic bus transfer device of claim 22, wherein said voltage level detector includes a comparator, said comparator having:

a first input terminal connected by said switching element, directly or indirectly, to said first input terminal of the relay when said switching element is in said first configuration, said first input terminal of the comparator being electrically connected by said switching element to a reference voltage when said switching element is in said second configuration;

a second input terminal connected by said switching element, directly or indirectly, to said second input terminal of the relay when said switching element is in said second configuration, said second input terminal of the comparator being electrically connected by said switching element to said reference voltage when said switching element is in said first configuration; and an output terminal electrically connected to said master portion of the relay.

24. The automatic bus transfer device of claim 19, further comprising a switching element electrically connected to said input of the voltage level detector, said switching element being switchable from a first configuration to a second configuration and from said second configuration to said first configuration, and wherein:

in said first configuration, said input of the voltage level detector is electrically connected, directly or indirectly, to said first input terminal of the relay, and in said second configuration, said input of the voltage level detector is electrically connected, directly or indirectly, to said second input terminal of the relay.

25. The automatic bus transfer device of claim 19, further comprising switching means for selectively determining which of said first and second input terminals of the relay constitutes said primary one of the first and second input terminals.

26. The automatic bus transfer device of claim 19, wherein said relay is arranged so as to provide substantially complete isolation between said first and second input terminals.

27. The automatic bus transfer device of claim 19, wherein:

said relay is a magnetically actuated relay;

said master portion includes a magnetic winding; and said slave portion includes electrical contacts which selectively electrically connect said output terminal of the relay to one of said first and second input terminals in a manner dependent upon whether a magnetic field is generated by said magnetic winding.

28. The automatic bus transfer device of claim 19, wherein said voltage level detector includes a comparator, said comparator having:

a first input terminal electrically connected to said primary one of said first and second input terminals of the relay;

a second input terminal electrically connected to a reference voltage; and an output terminal electrically connected to said master portion of the relay.

29. The automatic bus transfer device of claim 19, further comprising:

a first rectifier electrically connected between said input of the voltage level detector and said first input terminal of the relay; and a second rectifier electrically connected between said input of the voltage level detector and said second input terminal of the relay.

30. The automatic bus transfer device of claim 29, further comprising:

a first transformer electrically connected between said first rectifier and said first input terminal of the relay; and a second transformer electrically connected between said second rectifier and said second input terminal of the relay.

31. The automatic bus transfer device of claim 19, further comprising signal conditioning circuitry connected to the output terminal of the relay.

32. The automatic bus transfer device of claim 31, wherein said signal conditioning circuitry includes an electromagnetic interference filter and a power factor correction module.

33. The automatic bus transfer device of claim 32, wherein said signal conditioning circuitry is adapted to convert an AC voltage from one of said AC voltage sources into a DC voltage having a voltage level of at least 220 volts.

34. The automatic bus transfer device of claim 33, further comprising a voltage holding element connected to an output from said signal conditioning circuitry, said voltage holding element being adapted to maintain, during drops in voltage at said output terminal of the relay, a desired minimum voltage at said output from the signal conditioning circuitry for a predetermined minimum period of time.

35. The automatic bus transfer device of claim 34, wherein said voltage holding element includes at least one capacitor for temporarily storing energy which is used to provide said desired minimum amount of voltage during said drops in voltage at the output terminal of the relay.

36. The automatic bus transfer device of claim 32, further comprising at least one DC-to-DC converter connected to an output from said power factor correction module.

37. A dual-source power supply bus capable of automatically switching between two AC voltage sources, said dual-source power supply bus comprising:

a first AC voltage source;

a second AC voltage source; and an automatic bus transfer device which includes:

a relay having a master portion and a slave portion, said slave portion having a first input terminal connected to said first AC voltage source, a second input terminal connected to said second AC voltage source, and an output terminal, said slave portion being switchable from a primary state to a secondary state and from said secondary state to said primary state, said output terminal being electrically connected to a primary one of said first and second input terminals when said slave portion is in said primary state and being electrically connected to a secondary one of said first and second input terminals when said slave portion is in said secondary state; and a voltage level detector having an output connected to said master portion and an input connectable, directly or indirectly, to said primary one of the first and second input terminals of the relay so that:

when said primary one of the first and second input terminals carries an AC voltage having a peak value greater than a predetermined level, said slave portion is driven by said master portion into said primary state, and when said primary one of the first and second input terminals of the relay carries an AC voltage having a peak value less than said predetermined level, said slave portion is driven by said master portion into said secondary state.

38. The dual-source power supply bus of claim 37, further comprising a switching element for selectively determining which of said first and second input terminals of the relay constitutes said primary one of the first and second input terminals.

39. The dual-source power supply bus of claim 38, wherein said signal detector includes a comparator, said comparator having:

a first input terminal connected by said switching element, directly or indirectly, to said first input terminal of the relay when said first input terminal of the relay constitutes said primary one of the first and second input terminals, said first input terminal of the comparator being electrically connected by said switching element to a reference voltage when said first input terminal of the relay constitutes said secondary one of the first and second input terminals;

a second input terminal connected by said switching element, directly or indirectly, to said second input terminal of the relay when said second input terminal of the relay constitutes said primary one of the first and second input terminals, said second input terminal of the comparator being electrically connected by said switching element to said reference voltage when said second input terminal of the relay constitutes said secondary one of the first and second input terminals; and an output terminal electrically connected to said master portion of the relay.

40. The dual-source power supply bus of claim 38, wherein said switching element is electrically connected to said input of the voltage level detector, said switching element being switchable from a first configuration to a second configuration and from said second configuration to said first configuration, and wherein:

in said first configuration, said input of the voltage level detector is electrically connected, directly or indirectly, to said first input terminal of the relay, and in said second configuration, said input of the voltage level detector is electrically connected, directly or indirectly, to said second input terminal of the relay.

41. The dual-source power supply bus of claim 40, wherein said voltage level detector includes a comparator, said comparator having:

a first input terminal connected by said switching element, directly or indirectly, to said first input terminal of the relay when said switching element is in said first configuration, said first input terminal of the comparator being electrically connected by said switching element to a reference voltage when said switching element is in said second configuration;

a second input terminal connected by said switching element, directly or indirectly, to said second input terminal of the relay when said switching element is in said second configuration, said second input terminal of the comparator being electrically connected by said switching element to said reference voltage when said switching element is in said first configuration; and an output terminal electrically connected to said master portion of the relay.

42. The dual-source power supply bus of claim 37, further comprising a switching element electrically connected to said input of the voltage level detector, said switching element being switchable from a first configuration to a second configuration and from said second configuration to said first configuration, and wherein:

in said first configuration, said input of the voltage level detector is electrically connected, directly or indirectly, to said first input terminal of the relay, and in said second configuration, said input of the voltage level detector is electrically connected, directly or indirectly, to said second input terminal of the relay.

43. The dual-source power supply bus of claim 37, further comprising switching means for selectively determining which of said first and second input terminals of the relay constitutes said primary one of the first and second input terminals.

44. The dual-source power supply bus of claim 37, wherein said relay is arranged so as to provide substantially complete isolation between said first and second input terminals.

45. The dual-source power supply bus of claim 37, wherein:

said relay is a magnetically actuated relay;

said master portion includes a magnetic winding; and said slave portion includes electrical contacts which selectively electrically connect said output terminal of the relay to one of said first and second input terminals in a manner dependent upon whether a magnetic field is generated by said magnetic winding.

46. The dual-source power supply bus of claim 37, wherein said voltage level detector includes a comparator, said comparator having:

a first input terminal electrically connected to said primary one of said first and second input terminals of the relay;

a second input terminal electrically connected to a reference voltage; and an output terminal electrically connected to said master portion of the relay.

47. The dual-source power supply bus of claim 38, further comprising:

a first rectifier electrically connected between said switching element and said first input terminal of the relay; and a second rectifier electrically connected between said switching element and said second input terminal of the relay.

48. The dual-source power supply bus of claim 47, further comprising:

a first transformer electrically connected between said first rectifier and said first input terminal of the relay; and a second transformer electrically connected between said second rectifier and said second input terminal of the relay.

49. The dual-source power supply bus of claim 37, further comprising signal conditioning circuitry connected to the output terminal of the relay.

50. The dual-source power supply bus of claim 49, wherein said signal conditioning circuitry includes an electromagnetic interference filter and a power factor correction module.

51. The dual-source power supply bus of claim 50, wherein said signal conditioning circuitry is adapted to convert an AC voltage from one of said first and second AC voltage sources into a DC voltage having a voltage level of at least 220 volts.

52. The dual-source power supply bus of claim 51, further comprising a voltage holding element connected to an output from said signal conditioning circuitry, said voltage holding element being adapted to maintain, during drops in voltage at said output terminal of the relay, a desired minimum voltage at said output from the signal conditioning circuitry for a predetermined minimum period of time.

53. The dual-source power supply bus of claim 52, wherein said voltage holding element includes at least one capacitor for temporarily storing energy which is used to provide said desired minimum amount of voltage during said drops in voltage at the output terminal of the relay.

54. The dual-source power supply bus of claim 50, further comprising at least one DC-to-DC converter connected to an output from said power factor correction module.

55. A dual-source power supply bus capable of automatically switching between two DC voltage sources, said dual-source power supply bus comprising:

a first DC voltage source;

a second DC voltage source; and an automatic bus transfer device which includes:

a relay having a master portion and a slave portion, said slave portion having a first input terminal connected to said first DC voltage source, a second input terminal connected to said second DC voltage source, and an output terminal, said slave portion being switchable from a primary state to a secondary state and from said secondary state to said primary state, said output terminal being electrically connected to a primary one of said first and second input terminals when said slave portion is in said primary state and being electrically connected to a secondary one of said first and second input terminals when said slave portion is in said secondary state; and a voltage level detector having an output connected to said master portion and an input connectable, directly or indirectly, to said primary one of the first and second input terminals of the relay so that:

when said primary one of the first and second input terminals carries a DC voltage having a value greater than a predetermined level, said slave portion is driven by said master portion into said primary state, and when said primary one of the first and second input terminals of the relay carries a DC voltage having a value less than said predetermined level, said slave portion is driven by said master portion into said secondary state.

56. The dual-source power supply bus of claim 55, further comprising a switching element for selectively determining which of said first and second input terminals of the relay constitutes said primary one of the first and second input terminals.

57. The dual-source power supply bus of claim 56, wherein said signal detector includes a comparator, said comparator having:

a first input terminal connected by said switching element, directly or indirectly, to said first input terminal of the relay when said first input terminal of the relay constitutes said primary one of the first and second input terminals, said first input terminal of the comparator being electrically connected by said switching element to a reference voltage when said first input terminal of the relay constitutes said secondary one of the first and second input terminals;

a second input terminal connected by said switching element, directly or indirectly, to said second input terminal of the relay when said second input terminal of the relay constitutes said primary one of the first and second input terminals, said second input terminal of the comparator being electrically connected by said switching element to said reference voltage when said second input terminal of the relay constitutes said secondary one of the first and second input terminals; and an output terminal electrically connected to said master portion of the relay.

58. The dual-source power supply bus of claim 56, wherein said switching element is electrically connected to said input of the voltage level detector, said switching element being switchable from a first configuration to a second configuration and from said second configuration to said first configuration, and wherein:

in said first configuration, said input of the voltage level detector is electrically connected, directly or indirectly, to said first input terminal of the relay, and in said second configuration, said input of the voltage level detector is electrically connected, directly or indirectly, to said second input terminal of the relay.

59. The dual-source power supply bus of claim 58, wherein said voltage level detector includes a comparator, said comparator having:

a first input terminal connected by said switching element, directly or indirectly, to said first input terminal of the relay when said switching element is in said first configuration, said first input terminal of the comparator being electrically connected by said switching element to a reference voltage when said switching element is in said second configuration;

a second input terminal connected by said switching element, directly or indirectly, to said second input terminal of the relay when said switching element is in said second configuration, said second input terminal of the comparator being electrically connected by said switching element to said reference voltage when said switching element is in said first configuration; and an output terminal electrically connected to said master portion of the relay.

60. The dual-source power supply bus of claim 55, further comprising a switching element electrically connected to said input of the voltage level detector, said switching element being switchable from a first configuration to a second configuration and from said second configuration to said first configuration, and wherein:

in said first configuration, said input of the voltage level detector is electrically connected, directly or indirectly, to said first input terminal of the relay, and in said second configuration, said input of the voltage level detector is electrically connected, directly or indirectly, to said second input terminal of the relay.

61. The dual-source power supply bus of claim 55, further comprising switching means for selectively determining which of said first and second input terminals of the relay constitutes said primary one of the first and second input terminals.

62. The dual-source power supply bus of claim 55, wherein said relay is arranged so as to provide substantially complete isolation between said first and second input terminals.

63. The dual-source power supply bus of claim 55, wherein:

said relay is a magnetically actuated relay;

said master portion includes a magnetic winding; and said slave portion includes electrical contacts which selectively electrically connect said output terminal of the relay to one of said first and second input terminals in a manner dependent upon whether a magnetic field is generated by said magnetic winding.

64. The dual-source power supply bus of claim 55, wherein said voltage level detector includes a comparator, said comparator having:

a first input terminal electrically connected to said primary one of said first and second input terminals of the relay;

a second input terminal electrically connected to a reference voltage; and an output terminal electrically connected to said master portion of the relay.

65. The dual-source power supply bus of claim 55, further comprising signal conditioning circuitry connected to the output terminal of the relay.

66. The dual-source power supply bus of claim 65, wherein said signal conditioning circuitry includes an electromagnetic interference filter and a power factor correction module.

67. The dual-source power supply bus of claim 65, wherein said signal conditioning circuitry is adapted to convert a DC voltage from one of said first and second DC voltage sources into a DC voltage having a voltage level of at least 220 volts.

68. The dual-source power supply bus of claim 67, further comprising a voltage holding element connected to an output from said signal conditioning circuitry, said voltage holding element being adapted to maintain, during drops in voltage at said output terminal of the relay, a desired minimum voltage at said output from the signal conditioning circuitry for a predetermined minimum period of time.

69. The dual-source power supply bus of claim 68, wherein said voltage holding element includes at least one capacitor for temporarily storing energy which is used to provide said desired minimum amount of voltage during said drops in voltage at the output terminal of the relay.

70. The dual-source power supply bus of claim 66, further comprising at least one DC-to-DC converter connected to an output from said power factor correction module.

71. A dual-source power supply bus capable of automatically switching between two voltage sources, said dual-source power supply bus comprising:
   a first voltage source;
   a second voltage source; and
   an automatic bus transfer device which includes:
      a relay having a master portion and a slave portion, said slave portion having a first input terminal connected to said first voltage source, a second input terminal connected to said second voltage source, and an output terminal, said slave portion being switchable from a primary state to a secondary state and from said secondary state to said primary state, said output terminal being electrically connected to a primary one of said first and second input terminals when said slave portion is in said primary state and being electrically connected to a secondary one of said first and second input terminals when said slave portion is in said secondary state; and
      a voltage level detector having an output connected to said master portion and an input connectable, directly or indirectly, to said primary one of the first and second input terminals of the relay so that:
         when said primary one of the first and second input terminals carries a voltage having a value greater than a predetermined level, said slave portion is driven by said master portion into said primary state, and
         when said primary one of the first and second input terminals of the relay carries a voltage having a value less than said predetermined level, said slave portion is driven by said master portion into said secondary state.

72. The dual-source power supply bus of claim 71, further comprising a switching element for selectively determining which of said first and second input terminals of the relay constitutes said primary one of the first and second input terminals.

73. The dual-source power supply bus of claim 72, wherein said signal detector includes a comparator, said comparator having:
   a first input terminal connected by said switching element, directly or indirectly, to said first input terminal of the relay when said first input terminal of the relay constitutes said primary one of the first and second input terminals, said first input terminal of the comparator being electrically connected by said switching element to a reference voltage when said first input terminal of the relay constitutes said secondary one of the first and second input terminals;
   a second input terminal connected by said switching element, directly or indirectly, to said second input terminal of the relay when said second input terminal of the relay constitutes said primary one of the first and second input terminals, said second input terminal of the comparator being electrically connected by said switching element to said reference voltage when said second input terminal of the relay constitutes said secondary one of the first and second input terminals; and
   an output terminal electrically connected to said master portion of the relay.

74. The dual-source power supply bus of claim 72, wherein said switching element is electrically connected to said input of the voltage level detector, said switching element being switchable from a first configuration to a second configuration and from said second configuration to said first configuration, and wherein:
   in said first configuration, said input of the voltage level detector is electrically connected, directly or indirectly, to said first input terminal of the relay, and
   in said second configuration, said input of the voltage level detector is electrically connected, directly or indirectly, to said second input terminal of the relay.

75. The dual-source power supply bus of claim 74, wherein said voltage level detector includes a comparator, said comparator having:
   a first input terminal connected by said switching element, directly or indirectly, to said first input terminal of the relay when said switching element is in said first configuration, said first input terminal of the comparator being electrically connected by said switching element to a reference voltage when said switching element is in said second configuration;
   a second input terminal connected by said switching element, directly or indirectly, to said second input terminal of the relay when said switching element is in said second configuration, said second input terminal of the comparator being electrically connected by said switching element to said reference voltage when said switching element is in said first configuration; and
   an output terminal electrically connected to said master portion of the relay.

76. The dual-source power supply bus of claim 71, further comprising a switching element electrically connected to said input of the voltage level detector, said switching element being switchable from a first configuration to a second configuration and from said second configuration to said first configuration, and wherein:
   in said first configuration, said input of the voltage level detector is electrically connected, directly or indirectly, to said first input terminal of the relay, and
   in said second configuration, said input of the voltage level detector is electrically connected, directly or indirectly, to said second input terminal of the relay.

77. The dual-source power supply bus of claim 71, further comprising switching means for selectively determining which of said first and second input terminals of the relay constitutes said primary one of the first and second input terminals.

78. The dual-source power supply bus of claim 71, wherein said relay is arranged so as to provide substantially complete isolation between said first and second input terminals.

79. The dual-source power supply bus of claim 71, wherein:
   said relay is a magnetically actuated relay;
   said master portion includes a magnetic winding; and
   said slave portion includes electrical contacts which selectively electrically connect said output terminal of the relay to one of said first and second input terminals in a manner dependent upon whether a magnetic field is generated by said magnetic winding.

80. The dual-source power supply bus of claim 71, wherein said voltage level detector includes a comparator, said comparator having:
   a first input terminal electrically connected to said primary one of said first and second input terminals of the relay;
   a second input terminal electrically connected to a reference voltage; and
   an output terminal electrically connected to said master portion of the relay.

81. The dual-source power supply bus of claim 72, wherein said first voltage source is an AC voltage source and said second voltage source is a DC voltage source, further comprising:
   a first rectifier electrically connected between said switching element and said first input terminal of the relay.

82. The dual-source power supply bus of claim 81, further comprising:
   a first transformer electrically connected between said first rectifier and said first input terminal of the relay.

83. The dual-source power supply bus of claim 71, further comprising signal conditioning circuitry connected to the output terminal of the relay.

84. The dual-source power supply bus of claim 83, wherein said signal conditioning circuitry includes an electromagnetic interference filter and a power factor correction module.

85. The dual-source power supply bus of claim 84, wherein said signal conditioning circuitry is adapted to convert a voltage from one of said first and second voltage sources into a DC voltage having a voltage level of at least 220 volts.

86. The dual-source power supply bus of claim 85, further comprising a voltage holding element connected to an output from said signal conditioning circuitry, said voltage holding element being adapted to maintain, during drops in voltage at said output terminal of the relay, a desired minimum voltage at said output from the signal conditioning circuitry for a predetermined minimum period of time.

87. The dual-source power supply bus of claim 86, wherein said voltage holding element includes at least one capacitor for temporarily storing energy which is used to provide said desired minimum amount of voltage during said drops in voltage at the output terminal of the relay.

88. The dual-source power supply bus of claim 84, further comprising at least one DC-to-DC converter connected to an output from said power factor correction module.

* * * * *